US010332267B2

(12) United States Patent
Rai et al.

(10) Patent No.: US 10,332,267 B2
(45) Date of Patent: *Jun. 25, 2019

(54) REGISTRATION OF FLUOROSCOPIC IMAGES OF THE CHEST AND CORRESPONDING 3D IMAGE DATA BASED ON THE RIBS AND SPINE

(71) Applicant: Broncus Medical Inc., San Jose, CA (US)

(72) Inventors: Lav Rai, Sunnyvale, CA (US); Jason David Gibbs, State College, PA (US); Henky Wibowo, Cupertino, CA (US)

(73) Assignee: Broncus Medical Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/876,994

(22) Filed: Jan. 22, 2018

(65) Prior Publication Data

US 2018/0144489 A1    May 24, 2018

Related U.S. Application Data

(63) Continuation of application No. 14/910,656, filed as application No. PCT/US2014/050228 on Aug. 7, 2014, now Pat. No. 9,875,544.

(60) Provisional application No. 61/864,480, filed on Aug. 9, 2013.

(51) Int. Cl.
*A61B 6/00* (2006.01)
*G06T 7/33* (2017.01)
*G06T 7/00* (2017.01)

(52) U.S. Cl.
CPC ............. *G06T 7/33* (2017.01); *G06T 7/0012* (2013.01); *G06T 2207/10121* (2013.01); *G06T 2207/30008* (2013.01); *G06T 2207/30012* (2013.01)

(58) Field of Classification Search
CPC .................................. G06K 9/00; G06T 7/00
USPC ......... 382/128–134; 600/407, 410, 411, 594; 378/42
See application file for complete search history.

(56) References Cited

U.S. PATENT DOCUMENTS

| 7,508,388 | B2* | 3/2009 | Barfuss | A61B 6/466 345/418 |
| 7,867,728 | B2* | 1/2011 | Marfurt | C12Q 1/54 422/423 |
| 8,233,691 | B2* | 7/2012 | Barschdorf | G06T 7/251 382/131 |
| 9,255,885 | B2* | 2/2016 | Dickopf | C12Q 1/54 |

* cited by examiner

*Primary Examiner* — Abolfazl Tabatabai
(74) *Attorney, Agent, or Firm* — Richard Batt

(57) ABSTRACT

The present invention is a method to register 3D image data with fluoroscopic images of the chest of a patient. The ribs and spine, which are visible in the fluoroscopic images, are analyzed and a rib signature or cost map is generated. The rib signature or cost map is matched to corresponding structures of the 3D image data of the patient. Registration is evaluated by computing a difference between the fluoroscopic image and a virtual fluoroscopic projected image of the 3D data. Related systems are also described.

20 Claims, 5 Drawing Sheets

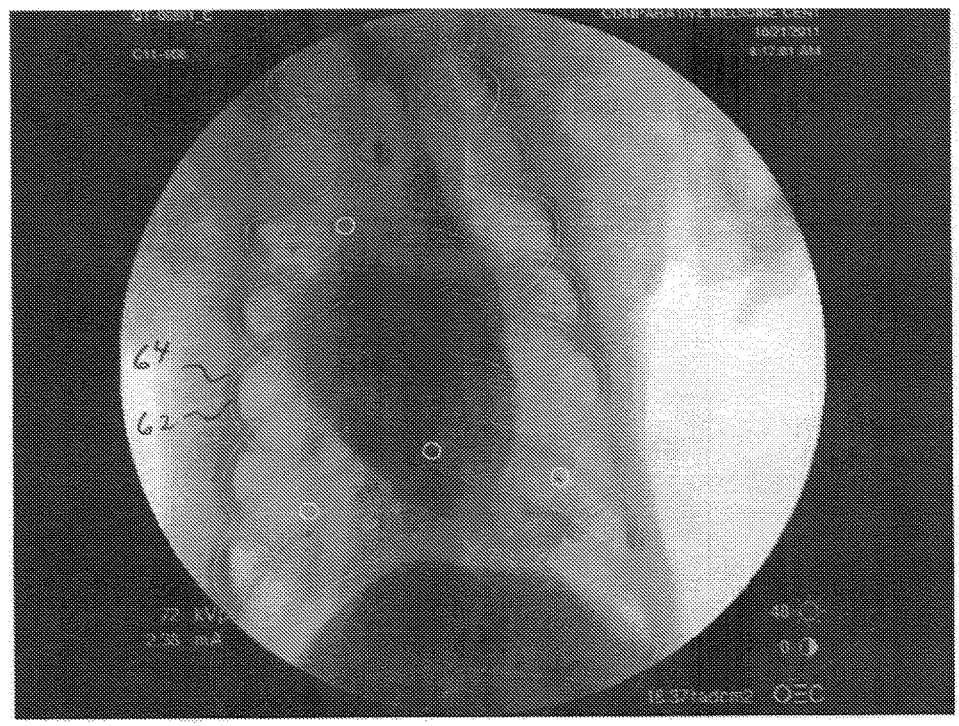
Figure 3

REGISTRATION OF FLUOROSCOPIC IMAGES OF THE CHEST AND CORRESPONDING 3D IMAGE DATA BASED ON THE RIBS AND SPINE

CROSS-REFERENCE TO RELATED APPLICATIONS

The present application is a continuation application of U.S. patent application Ser. No. 14/910,656, filed Feb. 5, 2016, which is a national phase filing under 35 U.S.C. 371 of International Patent Application No. PCT/US2014/050228, filed Aug. 7, 2014, which claims the benefit of U.S. provisional patent application No. 61/864,480, filed Aug. 9, 2013.

BACKGROUND OF THE INVENTION

Registering a 3D image data of the chest with fluoroscopic images may be carried out by directly comparing virtual fluoroscopic images with real fluoroscopic images. Various anatomical features are used to register the images including but not limited to the heart and diaphragm. The heart and diaphragm, however, have significant size compared to other features and thus can incorrectly bias the registration results towards aligning the heart and diaphragm.

An example of an inaccurate registration 10 suffering from the shortcoming described above is shown in FIG. 1. Projected virtual rib 12 is shown off-set from fluoroscopic rib 14. The off-set arises due to an overemphasis on aligning the diaphragm 16. This bias/error increases due to the difference in breathing level (and heart beat activity) between 3D image and fluoroscopic image.

Accordingly, techniques for registration are desired that avoid the above described shortcomings.

SUMMARY OF THE INVENTION

The description, objects and advantages of the present invention will become apparent from the detailed description to follow, together with the accompanying drawings.

A method and system to register 3D image data with fluoroscopic images of the thorax of a patient is described. The ribs and spine, which are visible in the fluoroscopic images, are analyzed and a rib signature or cost map is generated. The rib signature or cost map is matched to corresponding structures of the 3D image data of the patient. Registration may be evaluated by computing a difference between the fluoroscopic image and a virtual fluoroscopic projected image of the 3D data.

In another embodiment, a method to assist with registering 3D data with 2D fluoroscopic images of a thorax of a patient comprises receiving a 2D fluoroscopic image data set of the thorax including an anatomical structure which is visible under fluoroscopy; and approximating a candidate location of the anatomical structure based on the 2D fluoroscopic image data set. In embodiments, the anatomical structure is one structure selected from the group comprising a rib and spine.

The method may further comprise receiving a 3D data set of the anatomical structure in the thorax; and registering the 3D data set with the 2D fluoroscopic image data set based on the approximating step. The 3D data set may be at least one data selected from the group comprising image data and model data.

In embodiments, the registering may comprise computing a 3D-projected location of the anatomical structure from the 3D data set, and matching the 3D-projected location of the anatomical structure from the 3D data set with the candidate location of the anatomical structure from the approximating step.

In embodiments, the method further comprises, at least in part, manually selecting the candidate location of the anatomical structure in the 2D fluoroscopic image data set.

In embodiments, the approximating step may comprise automatically determining a probability map of rib and spine locations. The probability may be generated by applying a filter which assigns a high cost to certain shapes (e.g., a local strip, bar, band, or stripe).

In embodiments, the method further comprises computing centerlines of the anatomical structure from the 3D data set, and performing the registration step based on the centerlines.

In other embodiments, the method further comprises estimating a motion between the candidate location of the anatomical structure from the approximating step, and the 3D-projected location of the anatomical structure from the 3D data set.

In another embodiment, a fluoroscopy assistance system to assist with registering 3D data with 2D fluoroscopic images of a chest of a patient comprises a computer processor programmed to receive a 2D fluoroscopic image data set of the chest including an anatomical structure which is visible under fluoroscopy; compute a candidate signature representing the anatomical structure based on the 2D fluoroscopic image data; receive a 3D data set of the chest including the anatomical structure; compute a virtual signature based on the 3D data set; match the candidate signature to the virtual signature of the anatomical structure; and register the 3D data set with the 2D fluoroscopic image data set based on the previous match. The anatomical structure is preferably one structure selected from the group comprising a rib and spine.

In embodiments, the 3D data set is at least one data selected from the group comprising image data and model data.

In embodiments, the system further comprises computing a difference between the candidate signature of the anatomical structure and the virtual signature anatomical structure from the 3D data set.

In embodiments, the system comprises automatically determining a probability map of rib and spine locations upon which the candidate signature is based. The probability map may be generated by applying a filter which assigns a high cost to certain shapes.

In embodiments, the virtual signature is a virtual fluoroscopic projected image of the anatomical structure. In embodiments, the virtual signature may comprise centerlines of ribs.

In another embodiment, a method for evaluating a completed registration between a 2D fluoro image of the thorax and a 3D-based fluoro projection image computed from a 3D data set comprises estimating a 2D displacement motion between the 2D fluoro image and the 3D-based fluoro projection image; and computing a final displacement error based on the 2D displacement motion from the estimating step.

The 2D displacement motion may comprise a plurality of 2D displacement values, and the final displacement error is based on weighting at least one displacement value more than another.

The step of estimating the 2D displacement motion may be performed with a block matching algorithm. And a higher weighting is assigned to displacement values associated with a boney structure.

In embodiments, the boney structure comprises ribs and spine. In other embodiments, the boney structure may exclude the diaphragm.

In embodiments, prior to computing the displacement error, a rib-probability map is generated based on the 2D fluoro image of the thorax and approximating a candidate location of the ribs.

In embodiments, the method further comprises detecting patient motion post-registration by receiving a current fluoroscopic image; and computing a current 2D displacement motion between the current fluoroscopic image and the 3D-based fluoro projection image. The method may indicate whether the patient has moved. The step of indicating may be performed by computing whether the current 2D displacement motion exceeds an acceptable range.

BRIEF DESCRIPTION OF THE DRAWINGS

FIG. 3 illustrates a registration between a virtual image arising from the 3D image data with a real fluoroscopic image in accordance with one embodiment of the invention;

DETAILED DESCRIPTION OF THE INVENTION

Before the present invention is described in detail, it is to be understood that this invention is not limited to particular variations set forth herein as various changes or modifications may be made to the invention described and equivalents may be substituted without departing from the spirit and scope of the invention. As will be apparent to those of skill in the art upon reading this disclosure, each of the individual embodiments described and illustrated herein has discrete components and features which may be readily separated from or combined with the features of any of the other several embodiments without departing from the scope or spirit of the present invention. In addition, many modifications may be made to adapt a particular situation, material, composition of matter, process, process act(s) or step(s) to the objective(s), spirit or scope of the present invention. All such modifications are intended to be within the scope of the claims made herein.

Methods recited herein may be carried out in any order of the recited events which is logically possible, as well as the recited order of events. Furthermore, where a range of values is provided, it is understood that every intervening value, between the upper and lower limit of that range and any other stated or intervening value in that stated range is encompassed within the invention. Also, it is contemplated that any optional feature of the inventive variations described may be set forth and claimed independently, or in combination with any one or more of the features described herein.

All existing subject matter mentioned herein (e.g., publications, patents, patent applications and hardware) is incorporated by reference herein in its entirety except insofar as the subject matter may conflict with that of the present invention (in which case what is present herein shall prevail).

Reference to a singular item, includes the possibility that there are plural of the same items present. More specifically, as used herein and in the appended claims, the singular forms "a," "an," "said" and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation. Last, it is to be appreciated that unless defined otherwise, all technical and scientific terms used herein have the same meaning as commonly understood by one of ordinary skill in the art to which this invention belongs.

Figure 1:
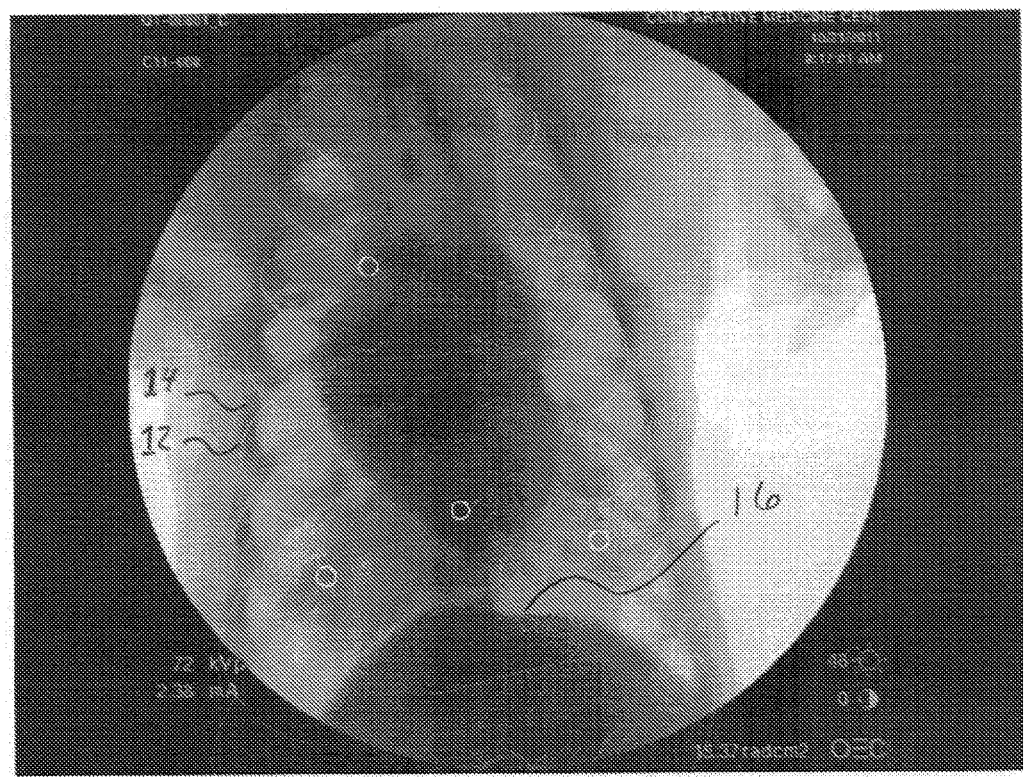
FIG. 1 illustrates an inaccurate registration between a virtual image arising from the 3D image data and a real fluoroscopic image.
Figure 1:

As described above in connection with FIG. 1, an overemphasis on aligning the diaphragm leads to an inaccurate registration. Embodiments of the present invention seek to avoid the above described shortcoming by, amongst other things, computing or approximating a candidate location of the ribs and spine, and aligning these structures in both 3D image and fluoroscopic images. In embodiments, this technique is not as susceptible to overemphasis on the diaphragm because the diaphragm is not weighted as high as other visible anatomical structures in the chest. Or, in embodiments, the diaphragm may be excluded altogether.

Figure 2:
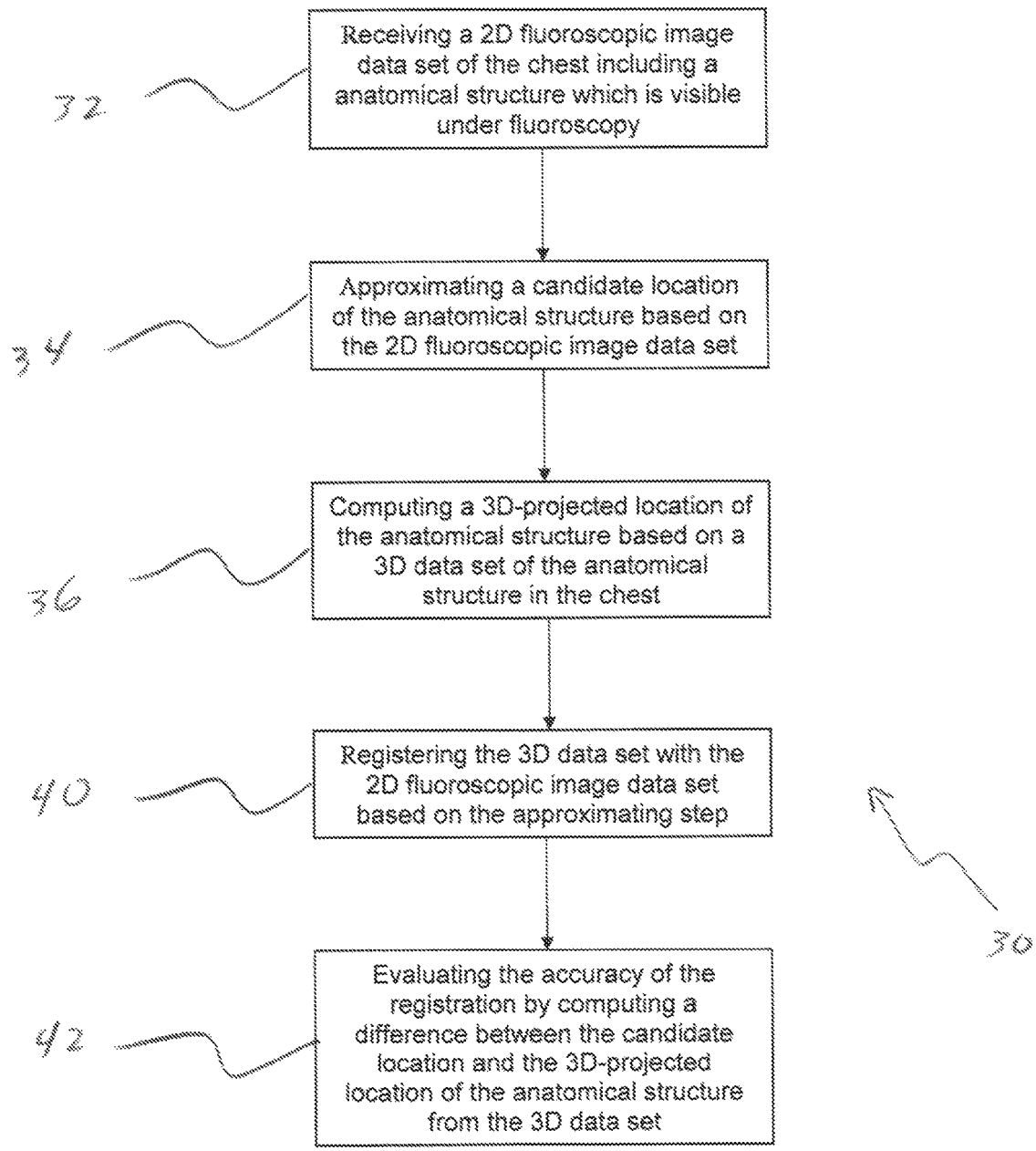
FIG. 2 illustrates a flow diagram of a method for registering 3D image data with a fluoroscopic image.

FIG. 2 is an overview of a method 30 to assist an operator with registering 3D data with 2D fluoroscopic images of a chest of a patient. The method may be performed by a computer or workstation having, amongst other components, a processor programmed with software and a memory device. An exemplary workstation is described in US Patent Publication No. 2012/0289825, filed: May 11, 2011, and entitled "FLUOROSCOPY-BASED SURGICAL DEVICE TRACKING METHOD AND SYSTEM." Results may be shown on a monitor, display, or printout or portable computing device.

With reference to FIG. 2, first step 32 indicates to receive a 2D fluoroscopic image data set of the thorax or chest including an anatomical structure which is visible under fluoroscopy, namely, the ribs or spine. A computer having a memory may be operable to receive the fluoroscopy images from a fluoroscopy unit such as a C-arm fluoroscope (not shown).

Approximating the Bone Structure

Next, step 34 approximates a candidate location (or signature) of the anatomical structure based on the 2D fluoroscopic image data set that is nearly the actual location of the anatomical structure.

Step 34 computes a candidate location (signature, or cost map) of the visible anatomical structure shown in the 2D fluoroscopic image data.

In particular, a filter is applied to weigh certain anatomical structures more than others. The ribs and spine, for example, are weighted more than other structures. In embodiments, the diaphragm and heart are assigned a minimal cost, or excluded altogether.

Figure 4:
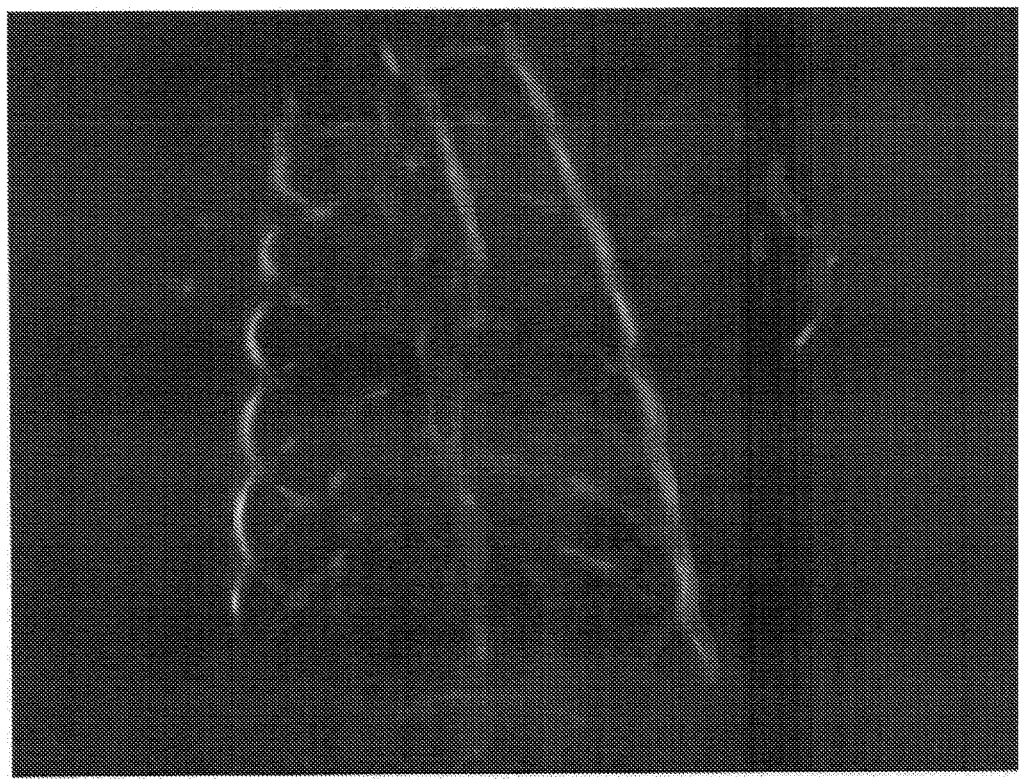
FIG. 4 illustrates a rib approximation based on analysis of the fluoroscopic image.

FIG. 4 illustrates a candidate location or signature of the ribs and spine. It is representative of a rib-cost or probability map. A higher cost is placed on the pixels containing ribs and spine than on the other structures. A lower cost is placed on pixels not comprising the ribs and spine.

Figure 5:
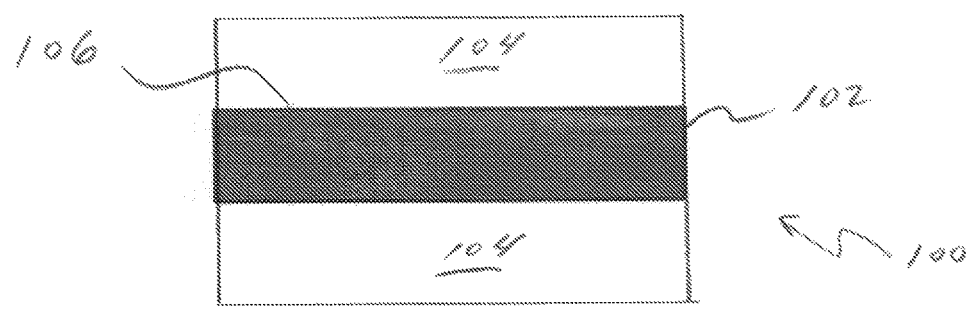
FIG. 5 illustrates an image block containing a stripe.

Various filters may be applied to generate the cost or probability map. FIG. 5 is an example of a tool to evaluate and determine costs. In particular, FIG. 5 shows a local stripe 102 defined as a dark stripe surrounded by brighter area 104. In embodiments, the rib-cost for any pixel is generated by applying a customized local filter which generates high cost for local stripes as shown in FIG. 5. This filter and tool serves to highlight the boundaries of the ribs and spine 80 as shown in FIG. 4.

Although the filter described above specifies a stripe or a rectangle, other shapes may be used to capture boundaries of the bone in the fluoroscopic images. A machine-learning based approach can also be used to generate rib-cost image. Additionally, in other embodiments, a light shape may be surrounded by dark area, or vice-versa.

In one embodiment, the rib-cost image contains a maximum-cost value for each pixel. The maximum-cost is computed as the maximum over a range of angle and thickness of a rectangular strip centered at that pixel. The rectangular strip signifies a possible rib-projection section passing through this pixel. In one embodiment, given a thickness and angle of the rectangular strip, the cost at a pixel is given by a weighted combination of border-cost and region cost. The border-cost is computed over pixels along the longer-edge of the rectangular stripe: Border-cost=Laplacian cost+(1-2*AngleBetween(Stripe direction, Image-gradient)/pi), where the Laplacian and Image-gradient are standard operations computed over fluoroscopic image. These operations are described in *Digital Image* Processing by Gonzalez and Woods. The Region-cost is given by:

RegionCost=(MeanOutVal−MeanInVal)/(1+stdInVal+stdOutVal)

If MeanOutVal>MeanInVal and
RegionCost=0 otherwise,
where (MeanOutVal, stdOutVal) are mean and standard-deviations of pixel intensities in region outside the stripe (e.g., bright area in FIG. 5) and (MeanInVal, stdInVal) are mean and standard-deviations of pixel intensities in region inside the stripe (e.g., dark area in FIG. 5).

Additionally, although the above approximating step is described as automatically performed on a computer processor, in other embodiments, the operator may, at least in part, manually input and select the candidate location (boundaries, bodies, assign cost values) of the anatomical structure in the 2D fluoroscopic image data set.

Compute Virtual fluoroscopic projection from 3D image data

With reference to FIG. 2, step 36 recites to compute a 3D-projected location of the anatomical structure based on a 3D data set. Available 3D image data from the subject includes without limitation high resolution computed tomography (HRCT) scans, MRI, PET, 3D angiographic, and X-ray data sets. Optionally, Ribs, spine, and bones are segmented out from 3D image and their centerlines may be computed.

In a method, or system, the workstation receives a 3D image file, 3D image data set, or a set of 2D images of the organ from which a 3D model of the organ may be computed. The workstation may communicate with the DICOM, for example, to receive such data sets. An exemplary technique to determine a 3D model of the body organ is disclosed in U.S. Pat. No. 7,756,316 entitled "Method and system for automatic lung segmentation". See also, U.S. Pat. Nos. 7,889,905 and 7,756,563; and Patent Publication No. 2008/0183073 all to Higgins et al. An exemplary technique to segment out the spine is described in "Spine segmentation using articulated shape models" by Klinder et al and to segment ribs is described in "Automatic rib segmentation in CT data" by Staal et al. An exemplary technique to generate projected virtual fluoroscopic images from the 3D data is described in "GPU accelerated generation of digitally reconstructed radiographs for 2D/3D image registration" by Dorgham et al.

Figure 6:
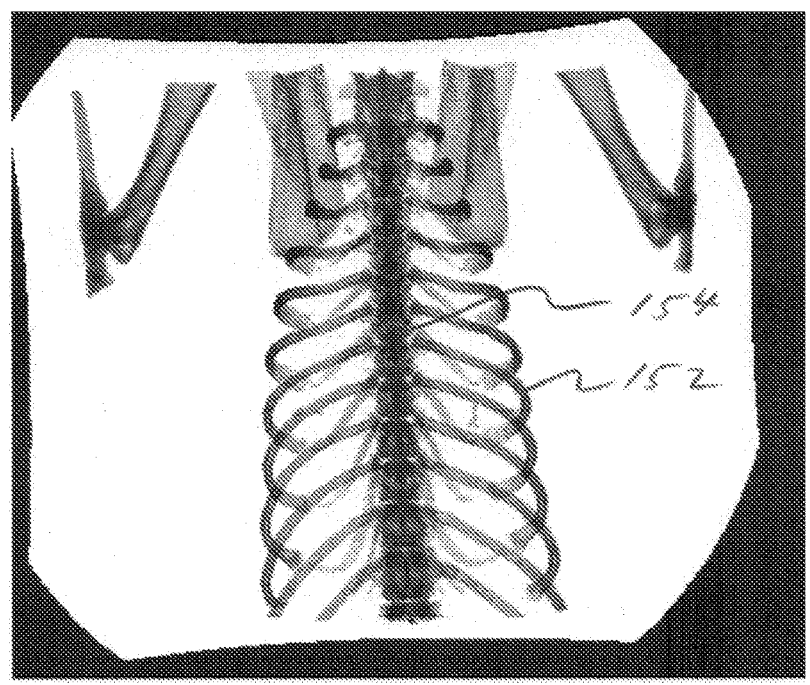
FIG. 6 illustrates a virtual fluoroscopic image of the ribs generated from 3D image data.
Figure 6:
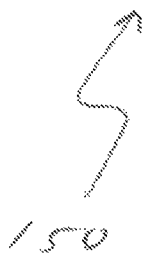

A resultant image of a virtual fluoroscopic image generated in accordance with step 36 is shown in FIG. 6. Ribs 152 and spine 154 are visible, having the other tissues removed.

Registering

With reference again to FIG. 2, step 40 registers the 3D data set with the 2D fluoroscopic image data. In particular, the registering step comprises matching the 3D-projected location (virtual fluoroscopic image) from step 36 and the candidate location (signature, or cost map) of the anatomical structure from the approximating step 34.

In embodiments, an alignment cost is computed for any transformation, and the fluoroscopic image can be registered with the 3D data by estimating the optimal transformation which maximizes the alignment cost. This optimal transformation can be determined by an optimizer routine such as Powell optimizer.

One example of computing alignment cost between the virtual fluoroscopic image 36 and rib-cost images from step 34, is: pixel-alignment-cost=rib-cost if bony tissue projects to this pixel in virtual fluoroscopic image; and pixel-alignment cost=0 otherwise.

Using the above described computation for alignment cost, the applicable images may be aligned. An example of an aligned virtual fluoroscopic image and real fluoroscopic image is shown in FIG. 3. Despite the challenges arising from patient breathing and her heart beat motion, the projected virtual ribs 62 are shown accurately aligned with the fluoroscopy counterparts 64.

Centerline Based Registration

In another embodiment, during registration, an optimal transformation between 3D image and fluoroscopic images is computed which aligns rib-centerlines projected from the 3D image with the ribs observed in fluoroscopic images.

For a given transformation, rib centerlines are projected to the fluoroscopic image. A distance map is computed from the rib-projections. The distance map provides an approximate shortest distance to a rib location for each pixel.

In embodiments, an alignment cost is computed as a combination of the distance map and rib cost image from step 34, described above, for all pixels. In embodiments, an alignment cost at a pixel is higher if the distance from closest rib-centerline is small, and the rib-cost is higher at this pixel. One example of alignment cost at a pixel is alignment-cost(x,y)=rib-cost(x,y)/(1+distance-map(x,y)). As described earlier, registration can now be done by an optimizer routine which finds the best transformation which maximizes the alignment cost.

Evaluation

After registration, optional step 42 computes a difference between the candidate location of the anatomical structure from the approximating step, and the 3D-projected location of the anatomical structure from the 3D data set. In a sense, the accuracy of the registration is evaluated.

In embodiments, a method for evaluating a completed registration between a 2D fluoro image of the chest and a 3D-based fluoro projection image computed from a 3D data set comprises estimating a 2D displacement motion between the 2D fluoro image and the 3D-based fluoro projection image. Then, the method comprises the step of computing a final displacement error based on the 2D displacement motion from the estimating step. In embodiments, the values associated with the ribs and spine may be weighted more than other values.

The 2D displacement motion may comprise a plurality of 2D displacement values, and the final displacement error is based on weighting at least one displacement value more than another.

In one embodiment, the 2D displacement motion acceptable range is 0 to 10 mm, preferably less than 3 mm. And, if the final displacement motion error does not fall within an acceptable range, registration is repeated or adjusted until the error falls within the suitable range.

In one embodiment, the step of estimating the 2D displacement motion can be performed with a block matching algorithm which finds the optimal 2D displacement for a pixel (current block) by maximizing the matching cost between the displaced block in virtual image and the current block in fluoroscopic image. The matching cost is computed using normalized-cross-correlation.

In another embodiment, a method may further comprise detecting patient motion post-registration by computing the 2D displacement motion between the current observed fluoroscopic image and the current estimate of the virtual fluoroscopic image estimated by transformation computed during registration. The 3D patient motion makes the 2D displacement motion estimate larger than the pre-motion estimate. In embodiments, excessive patient motion may be flagged if the motion exceeds the 2D displacement motion acceptable range, described above.

Other modifications and variations can be made to the disclosed embodiments without departing from the subject invention.

We claim:

1. A computer implemented method to assist with registering 3D data with fluoroscopic images of a thorax of a patient comprising the steps of:
   receiving the fluoroscopic images of the thorax including an anatomical structure which is visible under fluoroscopy;
   approximating a candidate location of the anatomical structure based on the fluoroscopic images;
   receiving a 3D data set of the anatomical structure in the thorax; and
   registering the 3D data set with the fluoroscopic images based on the approximating step; and
   wherein the registering step employs a routine on a computer to automatically calculate an optimal transformation that optimizes the alignment cost between the candidate location of the anatomical structure with the anatomical structure of the 3D data set.

2. The method of claim 1, wherein the anatomical structure is one structure selected from the group comprising a rib and spine.

3. The method of claim 1, wherein the 3D data set is at least one data selected from the group comprising image data and model data.

4. The method of claim 1, further comprising estimating a motion between the candidate location of the anatomical structure from the approximating step, and the 3D-projected location of the anatomical structure from the 3D data set.

5. The method of claim 1, further comprising, at least in part, manually selecting the candidate location of the anatomical structure in the fluoroscopic image data set.

6. The method of claim 1, wherein the approximating step comprises automatically determining a probability map of rib and spine locations.

7. The method of claim 1, further comprising computing centerlines of the anatomical structure from the 3D data set, and performing the registration step based on the centerlines.

8. A computer implemented method for evaluating a completed registration between fluoro images of the thorax and a 3D-based fluoro projection image computed from a 3D data set, the method comprising:
   estimating a displacement motion between the fluoro images and the 3D-based fluoro projection image;
   computing on a processor a final displacement error based on the displacement motion from the estimating step; and
   wherein the displacement motion comprises a plurality of displacement values computed on a processor between a weighted anatomical structure computed from the fluoro images and the 3D-based fluoro projection, and the final displacement error is based on weighting at least one displacement value more than another.

9. The method of claim 8, wherein the step of estimating the displacement motion is performed with a block matching algorithm.

10. The method of claim 9, wherein higher weighting is assigned to displacement values associated with a boney structure.

11. The method of claim 10, wherein the boney structure comprises ribs.

12. The method of claim 11, wherein the boney structure excludes the diaphragm.

13. The method of claim 8, wherein, prior to computing the displacement error, a rib-probability map is generated based on the fluoro images of the thorax and approximating a candidate location of the ribs.

14. The method of claim 8, comprising repeating or adjusting the completed registration based on the final displacement error.

15. The method of claim 8, further comprising detecting patient motion post-registration by:
   receiving current fluoroscopic images;
   computing a current 2D displacement motion between the current fluoroscopic images and 3D-based fluoro projection images.

16. The method of claim 15, further comprising indicating whether the patient has moved by computing whether the current 2D displacement motion exceeds an acceptable range.

17. A computer implemented fluoroscopy assistance system to assist with registering 3D data with fluoroscopic images of a thorax of a patient comprising a computer processor programmed to:
   receive a fluoroscopic image data set of the thorax including an anatomical structure which is visible under fluoroscopy;
   receive a 3D data set of the thorax including the anatomical structure;
   computing on a processor a candidate signature representing the anatomical structure based on the fluoroscopic image data and a virtual signature based on the 3D data set; and
   register the 3D data set with the fluoroscopic image data set based on the at least one of the candidate signature and the virtual signature;
   wherein the registering step employs a routine on a computer to automatically calculate an optimal transformation that optimizes the alignment cost between the candidate signature of the anatomical structure with the virtual signature of the 3D data set.

18. The system of claim 17, wherein the anatomical structure is one structure selected from the group comprising a rib and spine.

19. The system of claim 18, wherein the virtual signature comprises centerlines of ribs.

20. The system of claim 19, comprising computing the candidate signature and the virtual signature wherein the candidate signature is based on determining a probability map of rib and spine locations.

* * * * *